(12) United States Patent
Verbout

(10) Patent No.: US 11,734,464 B2
(45) Date of Patent: Aug. 22, 2023

(54) SECURE ACCESS KIOSK AND NETWORK

(71) Applicant: MetaSCIF, Inc., St Paul, MN (US)

(72) Inventor: Jeremy Verbout, St Paul, MN (US)

(73) Assignee: MetaSCIF, Inc., St Paul, MN (US)

( * ) Notice: Subject to any disclaimer, the term of this patent is extended or adjusted under 35 U.S.C. 154(b) by 0 days.

(21) Appl. No.: 17/940,085

(22) Filed: Sep. 8, 2022

(65) Prior Publication Data

US 2023/0081257 A1    Mar. 16, 2023

Related U.S. Application Data

(60) Provisional application No. 63/242,662, filed on Sep. 10, 2021.

(51) Int. Cl.
| | |
|---|---|
| *G06F 21/86* | (2013.01) |
| *G10K 11/16* | (2006.01) |
| *H05K 9/00* | (2006.01) |

(52) U.S. Cl.
CPC ............. *G06F 21/86* (2013.01); *G10K 11/16* (2013.01); *H05K 9/0081* (2013.01)

(58) Field of Classification Search
CPC ...... G06F 21/86; G10K 11/16; H05K 9/0081; H05K 9/0084; H05K 9/0088
See application file for complete search history.

(56) References Cited

U.S. PATENT DOCUMENTS

| | | | | |
|---|---|---|---|---|
| 4,794,206 | A | * | 12/1988 | Weinstein ............ H05K 9/0001 181/290 |
| 6,626,264 | B1 | * | 9/2003 | Christen ............... H05K 9/0001 181/290 |
| 2016/0306966 | A1 | | 10/2016 | Srivastava et al. |
| 2017/0041296 | A1 | | 2/2017 | Darji et al. |
| 2018/0032744 | A1 | | 2/2018 | Cavanaugh |
| 2019/0140357 | A1 | | 5/2019 | Grossman et al. |

OTHER PUBLICATIONS

International Search Report and Written Opinion of the International Application No. PCT/US2022/042700, dated Dec. 23, 2022, 11 pg.

* cited by examiner

*Primary Examiner* — Paul E Callahan
(74) *Attorney, Agent, or Firm* — Fredrikson & Byron, P.A.

(57) ABSTRACT

A secure access kiosk includes a plurality of walls interconnected to form an interior area within the secure access kiosk, a soundproofing element fixed at each wall of the plurality of walls, an electromagnetic shielding element fixed at each wall of the plurality of walls, and an information processing system security container within the interior area of the secure access kiosk. The information processing system security container houses at least one of a thin client or an ultra-thin client, and the thin client or the ultra-thin client is configured to provide a software interface and to prevent data storage or encryption to be stored at the thin client or ultra-thin client. The thin client or the ultra-thin client can include an integrated classified network interface within the interior area of the secure access kiosk.

18 Claims, 6 Drawing Sheets

SECURE ACCESS KIOSK AND NETWORK

RELATED APPLICATION

This application claims priority to US provisional patent application No. 63/242,662, which was filed on Sep. 10, 2021.

TECHNICAL FIELD

This disclosure generally relates to devices, systems, and methods to secure information (e.g., classified information) and communication, including secure information exchange. Embodiments disclosed herein can provide devices, systems, and methods that allow for more cost-effective, scalable, relatively light-weight classified facilities, and related infrastructure, that can be accredited to support confidential (e.g., classified) information and communication, including secure information exchange.

BACKGROUND

Security and privacy continue to gain importance and have become a top priority in many contexts, and the need for secure information and communication continues to grow. However, costs, generally in the millions of dollars, and construction time, generally measured in years, have prohibited wide-spread and reliable access to facilities that sufficiently support classified information processing and communication to meet public and private market needs.

For example, the number of citizens with security clearances within the US Government has increased exponentially in recent years. Yet, a large number of citizens and businesses with security clearances are restricted from accessing information or communication systems due to the limited number of available classified facilities, or facilities within a very limited geographic footprint, that provide the required infrastructure to perform the duties to work with classified information and communication. This oftentimes makes it difficult to conveniently carry out job duties consistent with information security requirements unless an individual lives close to, and has been granted access to, one of these select designated facilities. Thus, the current state of limited availability and access to classified facilities results in a trade-off of restricted employee work capacity and/or capability in addition to inhibited recruiting and low retention versus those employees with access to secured information facilities.

SUMMARY

In general, various embodiments relating to devices, systems, and methods for secure information and communication facilities and related infrastructure are disclosed herein. In particular, disclosed herein are embodiments that can provide more wide-spread, convenient, and cost-effective secure information (e.g., classified information) facilities and related infrastructure for secure information exchange. As a result, these embodiments can meet the increasing need for security and privacy in sensitive information communication by allowing for more scalable secure facilities and related infrastructure. For example, various embodiments disclosed herein can provide secure information and communication facilities and related infrastructure with associated costs generally in the thousands of dollars and construction/delivery times generally measured in days.

Disclosed herein are embodiments of a secure access kiosk. In some cases, such secure access kiosk embodiments as disclosed herein can be include a modular home or office-based classified facility and can be configured to provide a secure and convenient mechanism to enable public and private customers to accomplish classified work in, for instance, a soundproof and electro-magnetic resistant facility with information technology infrastructure to support each of the various classified environments.

One embodiment includes a secure access kiosk. The secure access kiosk includes a plurality of walls (e.g., modular construction walls) defining an interior area within the secure access kiosk. Each of the plurality of walls includes a soundproofing element and an electromagnetic shielding element (e.g., R-type foil, carbon nanotube(s), or electromagnetic permeation resistant metallic sheet(s)) fixed at each of the plurality of walls, with each of the soundproofing element and the electromagnetic shielding element located within each of the walls between a first wall board facing an exterior of the secure access kiosk and a second wall board facing the interior area of the secure access kiosk. Within the interior area of the secure access kiosk, the secure kiosk can include an information processing system security container housing a thin client, and/or an ultra-thin client, that has information technology and security systems. The thin or ultra-thin client can include a programmable processor and a non-transitory computer-readable storage article having computer-executable instructions stored thereon to cause at least one programmable processor to provide a software interface, with the non-transitory computer-readable storage article excluding storage of data other than the computer-executable instructions that, when executed, cause the programmable processor to provide the software interface such that the thin or ultra-thin client is configured to prevent data storage or encryption to be stored at the thin or ultra-thin client. Instead, the non-transitory computer-readable storage article, when executed, can cause the programmable processor to transmit such data outside the secure access kiosk for storage at a location outside the secure access kiosk.

In a further embodiment of the secure access kiosk, the secure access kiosk includes an integrated classified network. The secure access kiosk can include an integrated classified network connection interface that, when connected to, is configured to facilitate access to the integrated classified network while within the interior area of the secure access kiosk. The integrated classified network can include an approved agency (e.g., federal government) facility accreditation and an agency (e.g., federal government) approved authority to operate (ATO), and the integrated classified network connection interface can be configured to facilitate access to such integrated classified network while within the interior area of the secure access kiosk. The combination of the secure access kiosk, with one or more of the features disclosed herein, with such an integrated network can provide a convenient and secure information communication facility that reduces procurement time and costs as well as operating costs for the user.

In a further embodiment of the secure access kiosk, the secure access kiosk includes an acoustical ceiling. Each of the soundproofing element and the electromagnetic shielding element can extend, within each of the walls, both below and above the acoustical ceiling. In one such specific example, the electromagnetic shielding element can extend both perpendicular to and parallel to the acoustical ceiling, with the electromagnetic shielding element extending parallel to the acoustical ceiling at an elevational location above the acoustical ceiling (e.g., the electromagnetic shielding element is further from a floor surface of the kiosk than the acoustical ceiling). For instance, the electromagnetic shielding element can extend perpendicular to the acoustical ceiling within the wall and extend out from the wall to extend parallel to the acoustical ceiling when outside of the wall. In still a further such specific example, the electromagnetic shielding element can also extend parallel to the acoustical ceiling at a location adjacent a floor surface of the secure access kiosk.

In a further embodiment of the secure access kiosk, the secure access kiosk can include one or more security devices for detecting various conditions within the interior area of the secure access kiosk and/or proximate an exterior of the secure access kiosk. For instance, in one such further embodiment, the secure access kiosk can include one or more of an electromagnetic detector, a mobile computing device (e.g., cell phone) detector, an intrusion detection system, an alarm panel, personnel authentication device, a camera, and a lock (e.g., XO-10) associated with a door of the secure access kiosk.

Another embodiment includes a network system. The network system can include a secure access kiosk and a remote server in communication with the secure access kiosk via a primary network communication channel (e.g., an internet protocol channel) and a secondary network communication channel (e.g., a cellular channel). An interior area of the secure access kiosk can include an information processing system security container housing a thin client, or an ultra-thin client, that can be in communication, via the primary network communication channel and the secondary network communication channel, with the remote server. The ultra-thin client can include a programmable processor and a non-transitory computer-readable storage article having computer-executable instructions stored thereon to cause at least one programmable processor to provide a software interface, with the non-transitory computer-readable storage article excluding storage of data other than the computer-executable instructions that, when executed, cause the programmable processor to provide the software interface such that the thin client, or ultra-thin client, is configured to prevent data storage or encryption to be stored at the ultra-thin client (e.g., cloud architecture and compute).

In a further embodiment of the network system, the network system can include a central command center in communication with the secure access kiosk via the primary network communication channel and the secondary network communication channel.

An additional embodiment includes a secure access kiosk. This embodiment of the secure access kiosk includes a plurality of walls interconnected to form an interior area within the secure access kiosk, a soundproofing element fixed at each wall of the plurality of walls, an electromagnetic shielding element fixed at each wall of the plurality of walls, and an information processing system security container within the interior area of the secure access kiosk. The information processing system security container houses at least one of a thin client or an ultra-thin client. The thin client or the ultra-thin client comprises a programmable processor and a non-transitory computer-readable storage article having computer-executable instructions stored thereon to cause the programmable processor to provide a software interface, with the non-transitory computer-readable storage article excluding storage of data other than the computer-executable instructions that, when executed, cause the programmable processor to provide the software interface such that the thin client or ultra-thin client is configured to prevent data storage or encryption to be stored at the thin client or ultra-thin client.

In a further embodiment of this secure access kiosk, the thin client or the ultra-thin client includes an integrated classified network interface within the interior area of the secure access kiosk, and the integrated classified network interface is configured to connect the thin client or the ultra-thin client to an integrated classified network, where the integrated classified network includes an approved agency facility accreditation and an agency approved authority to operate. The computer-executable instructions, when executed, can be configured to cause the programmable processor at the thin client or ultra-thin client to transmit data outside of the interior area of the secure access kiosk, for storage at a location outside of the secure access kiosk, via the integrated classified network interface. The integrated classified network interface at the thin client or the ultra-thin client can include a primary network communication channel to a remote server and a secondary network communication channel to the remote server. For example, the primary network communication channel can be an internet protocol channel and the secondary network communication channel can be a cellular channel.

In a further embodiment of this secure access kiosk, the secure access kiosk further includes a door at a wall of the plurality of walls, with the door configured to provide access to the interior area of the secure access kiosk, a lock associated with the door and configured to facilitate selective access at the door to the interior area of the secure access kiosk, with the lock connected to the integrated classified network interface, and a camera positioned to capture image data at a location adjacent the door, with the camera connected to the integrated classified network interface. In one such example, the secure access kiosk can further include an electromagnetic detector configured to detect electromagnetic energy adjacent an exterior of the secure access kiosk, with the electromagnetic detector connected to the integrated classified network interface, and an intrusion detection system configured to detect unauthorized access to the interior area of the secure access kiosk, with the intrusion detection system connected to the integrated classified network interface. For instance, each of the lock, the camera, the electromagnetic detector, and the intrusion detection system can be connected to the remote server via the primary network communication channel and the secondary network communication channel.

In a further embodiment of this secure access kiosk, each wall of the plurality of walls includes a first wall board facing an exterior of the secure access kiosk and a second wall board facing the interior area of the secure access kiosk, and each of the soundproofing element and the electromagnetic shielding element extends within each wall of the plurality of walls between the first wall board and the second wall board. In one such example, the secure access kiosk can further include an acoustical ceiling supported at the plurality of walls, and each of the soundproofing element and the electromagnetic shielding element extends both above and below the acoustical ceiling. For instance, the electromagnetic shielding element can extend perpendicular to the acoustical ceiling where the electromagnetic shielding element extends within each wall of the plurality of walls and the electromagnetic shielding element can extend parallel to the acoustical ceiling where the electromagnetic shielding element extends outside of each wall of the plurality of walls and away from the soundproofing element. In a yet further such example, the secure access kiosk can further include a finished floor within the interior area of the secure access kiosk, and the electromagnetic shielding element can extend above the finished floor perpendicular to the finished floor and below the finished floor parallel to the finished floor. In an addition such example, the secure access kiosk can further include a wall-adjacent soundproofing element included at a void adjacent a wall of the plurality of walls and one of the finished floor and the acoustic ceiling. For instance, the wall-adjacent soundproofing element can include a first wall-adjacent soundproofing element and a second wall-adjacent soundproofing element, where the first wall-adjacent soundproofing element is located at a first void adjacent a first wall fixation member and the first wall board and the second wall-adjacent soundproofing element is located at a second void adjacent a second wall fixation member and the first wall board.

A further embodiment includes a system. This system embodiment includes a remote server and a secure access kiosk. The secure access kiosk includes a plurality of walls interconnected to form an interior area within the secure access kiosk, a soundproofing element fixed at each wall of the plurality of walls, an electromagnetic shielding element fixed at each wall of the plurality of walls, and an information processing system security container within the interior area of the secure access kiosk. The information processing system security container houses at least one of a thin client or an ultra-thin client. The thin client or the ultra-thin client includes a programmable processor and a non-transitory computer-readable storage article having computer-executable instructions stored thereon to cause the programmable processor to provide a software interface, with the non-transitory computer-readable storage article excluding storage of data other than the computer-executable instructions that, when executed, cause the programmable processor to provide the software interface such that the thin client or ultra-thin client is configured to prevent data storage or encryption to be stored at the thin client or ultra-thin client. The thin client or the ultra-thin client includes an integrated classified network interface within the interior area of the secure access kiosk. The integrated classified network interface is configured to connect the thin client or the ultra-thin client to the remote server via an integrated classified network. The integrated classified network includes an approved agency facility accreditation and an agency approved authority to operate.

In a further embodiment of this system, the computer-executable instructions, when executed, are configured to cause the programmable processor at the thin client or ultra-thin client to transmit data to the remote server outside of the interior area of the secure access kiosk, for storage at the remote server at a location outside of the secure access kiosk, via the integrated classified network interface. The integrated classified network interface at the thin client or the ultra-thin client includes a primary network communication channel to the remote server and a secondary network communication channel to the remote server. For example, the primary network communication channel can be an internet protocol channel and the secondary network communication channel can be a cellular channel.

In a further embodiment of this system, each wall of the plurality of walls includes a first wall board facing an exterior of the secure access kiosk and a second wall board facing the interior area of the secure access kiosk. Each of the soundproofing element and the electromagnetic shielding element extends within each wall of the plurality of walls between the first wall board and the second wall board. The secure access kiosk can further include an acoustical ceiling supported at the plurality of walls and a finished floor within the interior area of the secure access kiosk. Each of the soundproofing element and the electromagnetic shielding element extends both above and below the acoustical ceiling. The electromagnetic shielding element extends perpendicular to the acoustical ceiling where the electromagnetic shielding element extends within each wall of the plurality of walls, and the electromagnetic shielding element extends parallel to the acoustical ceiling where the electromagnetic shielding element extends outside of each wall of the plurality of walls and away from the soundproofing element. The electromagnetic shielding element extends above the finished floor perpendicular to the finished floor and below the finished floor parallel to the finished floor.

The details of one or more examples are set forth in the accompanying drawings and the description below. Other features, objects, and advantages will be apparent from the description and drawings.

BRIEF DESCRIPTION OF THE DRAWINGS

The following drawings are illustrative of particular embodiments of the present invention and, therefore, do not limit the scope of the invention. The drawings are intended for use in conjunction with the explanations in the following description. Embodiments of the invention will hereinafter be described in conjunction with the appended drawings, wherein like numerals denote like elements. The features illustrated in the drawings are not necessarily to scale, though embodiments within the scope of the present invention can include one or more of the illustrated features (e.g., each of the illustrated features) at the scale shown.

FIG. 1A is a perspective view of a front side of the secure access kiosk, FIG. 1B is a perspective view of a rear side of the secure access kiosk, and FIG. 1C is a cross-sectional view of a wall of the secure access kiosk.

DETAILED DESCRIPTION

The following detailed description is exemplary in nature and is not intended to limit the scope, applicability, or configuration of the invention in any way. Rather, the following description provides some practical illustrations for implementing embodiments of the present invention. Examples of constructions, materials, and/or dimensions are provided for selected elements. Those skilled in the art will recognize that many of the noted examples have a variety of suitable alternatives.

Figure 1A:
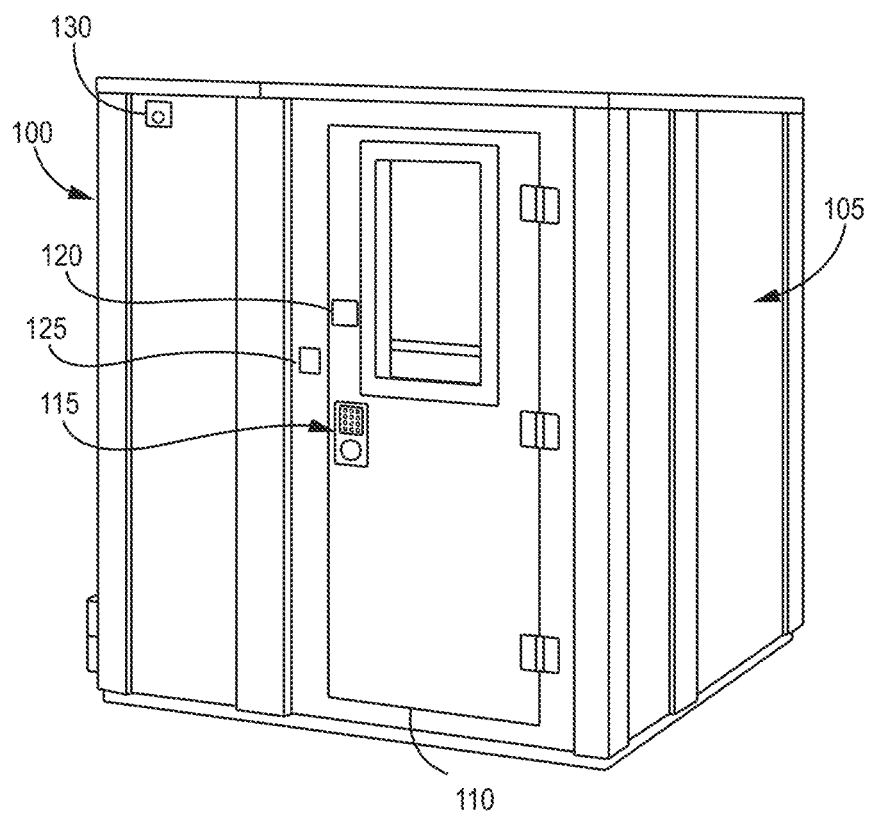
FIGS. 1A-1C illustrate an exemplary embodiment of a secure access kiosk.
Figure 1B:
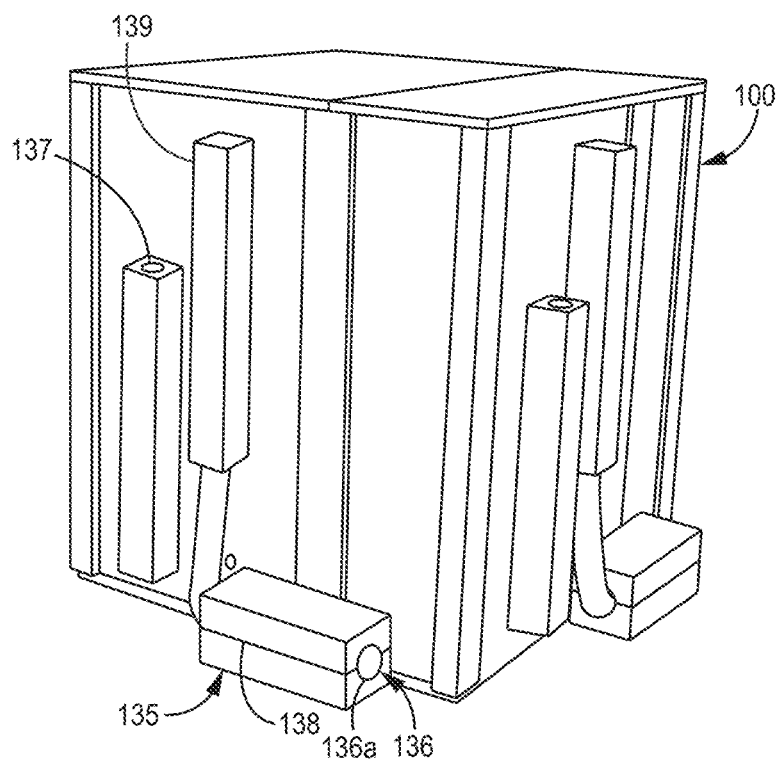
Figure 1C:
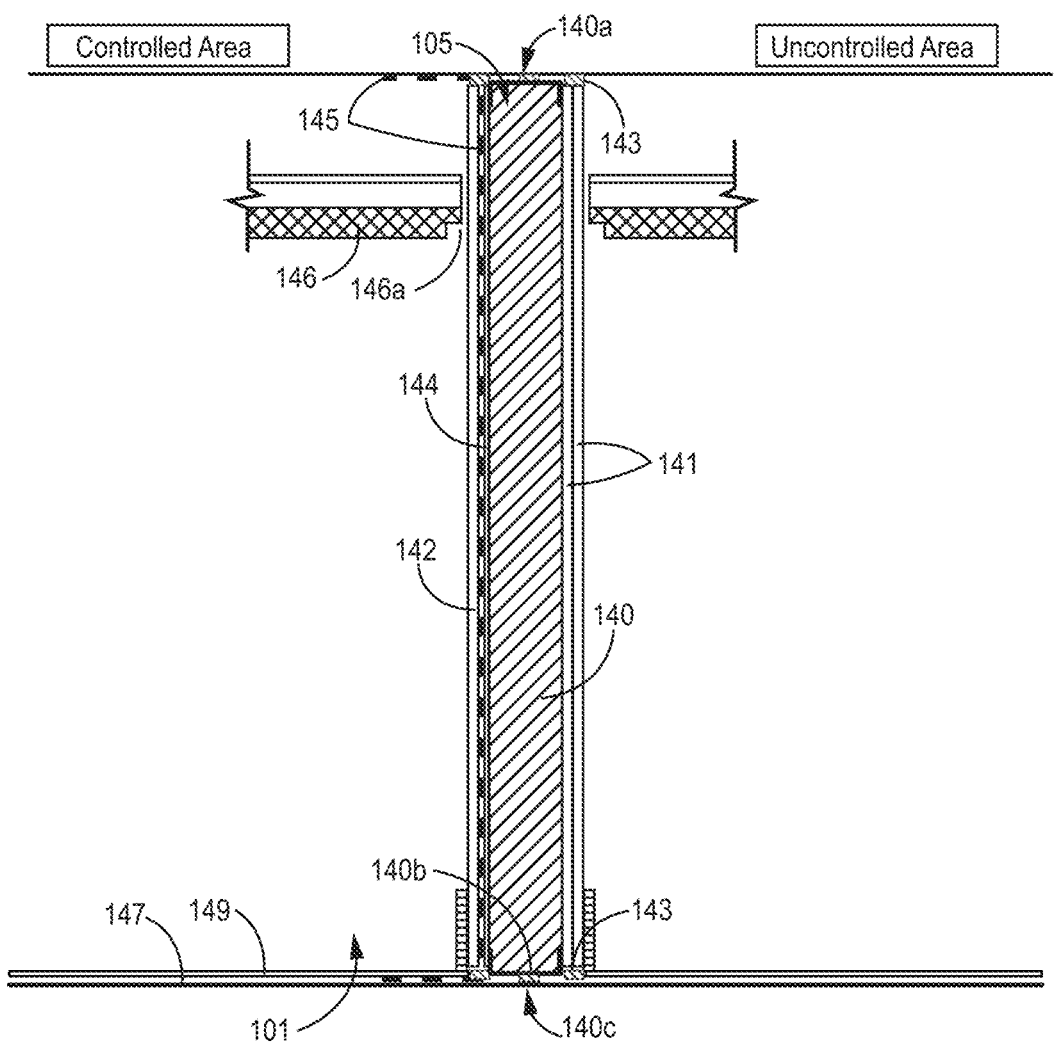

FIGS. 1A-1C shows an exemplary embodiment of a secure access kiosk 100. FIG. 1A shows a perspective view of a front side of the secure access kiosk 100, FIG. 1B shows a perspective view of a rear side of the secure access kiosk 100, and FIG. 1C is a cross-sectional view of a wall 105 of the secure access kiosk 100.

The secure access kiosk 100 can be configured to facilitate secure information communication. For example, the secure access kiosk 100 can be accredited as a classified facility to support Secret, Top Secret, Sensitive Compartmented Information, and Special Access Program clearances (e.g., for work with the US Federal Government). As one such specific example, the secure access kiosk 100 can include features compliant with Intelligence Control Directive (ICD) 705 and other Department of Defense and other Intelligence Community guidance and protocols to meet classified facility accreditation requirements. The secure access kiosk 100 can be a modular home or office-based classified facility and can be configured to provide a secure and convenient mechanism to enable public and private customers to accomplish classified work in, for instance, a soundproof and electro-magnetic resistant facility with information technology infrastructure to support each of the various classified environments.

In various embodiments, to provide classified facility physical security requirements, the secure access kiosk 100 can include features that eliminate or reduce noise propagation outside of the kiosk, eliminate or reduce electromagnetic emissions emanating through the kiosk, and facilitate security with numerous locking mechanisms, intrusion detection systems, access control systems, motion and cellular phone detection systems, video surveillance capability, heating, ventilation, and air conditioning (HVAC) system requirements, and/or security monitoring systems that help to ensure all systems are operating and controlled 24/7/365.

In the illustrated embodiment, the secure access kiosk 100 can be formed by a number of (e.g., multiple, such as four) walls 105 enclosing an interior area of the secure access kiosk 100. One of the walls 105 can include a door 110 to allow a user into, and out of, the interior area of the secure access kiosk 100. As one example, the door 110 can include an electromagnetic energy seal, for instance fixed at and around at least a portion of a perimeter (e.g., around a portion of a perimeter at an interior-facing surface) of the door 110. The secure access kiosk 100 can include a secure door access mechanism 115, associated with the door 110, and configured to allow for selective access into the interior area of the secure access kiosk 100 via the door 110. As another additional or alternative example, the secure door access mechanism 115 can include a user input device, such as a keypad or other mechanism to verify a user has credentials to access the interior area of the secure access kiosk 100. One non-limiting, suitable type of secure door access mechanism 115 can be an E-Plex or Lennar series door handle and associated keypad selective locking mechanism. As also included in the illustrated embodiment, the secure access kiosk 100 can include a lock 120. The lock 120 can allow for selective access to the interior area of the secure access kiosk 100 upon actuation of the lock 120 (e.g., via user input of a code or other unique input at the lock 120). One non-limiting, suitable type of lock 120 can be an XO-10 high security lock. Additionally included in the illustrated embodiment at the secure access kiosk 100 is a badge access device 125. The badge access device 125 can allow for selective access to the interior area of the secure access kiosk 100 upon actuation of the badge access device 125 (e.g., via a user radio frequency badge or other unique user associated token). One non-limiting, suitable type of badge access device 125 can be a Lenel series badging system. And, further included in the illustrated embodiment at the secure access kiosk 100 is a camera 130. The camera 130 can be configured, for example, to capture image data at, or proximate to, the door 110. In some embodiments, the camera 130 can itself include, or can communicate video data to, a video storage system so as to provide for an archived bank of generated image data from the camera 130. In one example, data (e.g., corresponding to a preset, authorized user) generated at the camera and/or badge access device 125 can cause a command signal to be generated and transmitted at the secure access kiosk 100 to cause the door 110 to unlock and be accessible.

The secure access kiosk 100 can also include a ventilation system 135. In the illustrated embodiment, the ventilation system 135 is mounted at the wall 105 on an exterior side of the secure access kiosk 100. The ventilation system 135 can include an intake duct 136 (e.g., including an anti-tamper duct and/or filter feature, such as a carbon nanotube or electromagnetic energy resistant metallic material fixed at the intake duct 136), a fan unit 138, and an exhaust duct 137. The ventilation system 135 can also include a filter 136a associated with the intake duct so as to filter air passing into the ventilation system 135 (e.g., and the anti-tamper duct feature can be associate with the filter 136a). In some embodiments, the ventilation system 135 can also include an air conditioning unit 139. Accordingly, the ventilation system 135 can be configured to provide air inflow into the interior area of the secure access kiosk 100 as well as air outflow from the interior area of the secure access kiosk 100, and, in some further embodiments, provide a temperature control function for the interior area of the secure access kiosk 100 via the air conditioning unit 139.

As noted, the secure access kiosk 100 can be configured to provide a soundproof and electromagnetic (e.g., radio frequency) shielded interior area 101 of the secure access kiosk 100. The walls 105 can define and enclose, at least in part, the interior area 101 of the secure access kiosk 100. In the illustrated embodiment, shown at FIG. 1C, the walls 105 of the secure access kiosk 100 can include both a soundproofing element 140 and an electromagnetic (e.g., radio frequency) shielding element 145. As shown in the illustrated embodiment of FIG. 1C, the soundproofing element 140 and the electromagnetic shielding element 145 can each be located within the wall 105. For example, each of the soundproofing element 140 and the electromagnetic shielding element 145 can be located between a first wall board 141 facing an exterior ("uncontrolled area") of the secure access kiosk 100 and a second wall board 142 facing an interior ("controlled area") of the secure access kiosk 100. As one example, this location of each of the soundproofing element 140 and the electromagnetic shielding element 145 can be compliant with Intelligence Control Directive 705. In one example, the soundproofing element 140 (e.g., 3.5 inch thick sound attenuation material) can be fixed to the first wall board 141 and the second wall board 142 via a first wall fixation member 140a and/or fixed to the first wall board 141 and the second wall board 142 via a second wall fixation member 140b. The first and second wall boards 141, 142 can be, as one example, gypsum wall board mounted via a fixation member (e.g., nail, screw) to a plywood substrate 144 in a manner that excludes contact between the fixation member and any support stud at the wall 105 so as to mitigate any possible acoustic flanking path via such fixation member. In the illustrated example, the wall 105 can include more than one (e.g., two) layers of the first wall board 141 and/or the second wall board 142, for instance where at least the second wall board 142 at the exterior of the wall 105 includes more than one layer of the second wall board 142. For instance, the first wall fixation member 140a (e.g., generally "U" shaped) and the second wall fixation member 140b (e.g., generally "U" shaped) can form a track at the top and bottom surfaces of the soundproofing element 140 to receive and hold the soundproofing element 140, and an acoustical sealant material 140c can interface with an anchor or other attachment member of first wall fixation member 140a and/or second wall fixation member 140b to help reduce sound emanating outside of the kiosk 100 at an interface of the anchor or other attachment member of first wall fixation member 140a and/or second wall fixation member 140b and floor 147 and/or 149 or ceiling 146 of the kiosk 100.

In addition to the soundproofing element 140, the illustrated embodiment of the secure access kiosk 100 can include one or more wall-adjacent soundproofing elements 143. The wall-adjacent soundproofing element 143 can, for instance, be included at any voids adjacent the wall 105, for example at any voids between the wall 105 and a floor (e.g., structural floor 147 and/or finished floor 149) and/or at any voids between a top end of the wall 105 and the first wall fixation member 140a at a top end of the wall 105. In some examples, the soundproofing element 140 can be in the form of one or more vertical soundproof baffles, and the wall-adjacent soundproofing element 143 can be in the form of a sealant introduced into any of the noted voids. As one example, the wall-adjacent soundproofing element 143 can located at each top and bottom end of each wall board 141, 142. In certain embodiments, in addition to the soundproofing element 140, one or more sound dampening baffles (e.g., sound dampening foam baffle) can be fixed along at least a portion of an interior-facing surface (e.g., surface facing the "controlled area") of the wall 105 to help reduce a degree of sound attenuation emanating to the exterior of the secure access kiosk 100. For instance, such one or more sound dampening baffles can be fixed along at least a portion of an interior-facing surface of the wall 105 (e.g., at the second wall board 142) and extending a length between the wall-adjacent soundproofing element 143 and an acoustic ceiling 146. In some such embodiments, the one or more sound dampening baffles can be an interior-most disposed component at the wall 105.

In some examples, the electromagnetic shielding element 145 can extend vertically (e.g., perpendicular to the floor) between the wall boards 141, 142 and extend horizontally when outside of the wall boards 141, 142. For instance, as shown in the example of FIG. 1C, the electromagnetic shielding element 145 can extend horizontally, within the interior area ("controlled area") of the secure access kiosk 100, above the acoustic ceiling 146 of the secure access kiosk 100 and adjacent a floor (e.g., between the finished floor 149 and the structural floor 147) of the secure access kiosk 100. This horizontal extension of the electromagnetic shielding element 145 can help to provide electromagnetic shielding at any potential voids between the wall 105 and any wall interfacing structure(s). As such, an edge (e.g., each edge) of the secure access kiosk 100 can be interlocked and sealed with the Foil Ultra NT Radiant Barrier for added electromagnetic (e.g., radio frequency) shielding. Exemplary types of a suitable such electromagnetic shielding element 145 can be rFoil® Ultra NT Radiant Barrier (e.g., 1800 series) available from Covertech Fabricating Inc and one or more carbon nanotubes from CHASM Advanced Materials, Inc.

More specifically, in various embodiments of the secure access kiosk 100, each of the soundproofing element 143 and the electromagnetic shielding element 145 can extend, within each of the walls 105, both below and above the acoustical ceiling 146 and/or both below and above finished floor 149 (e.g., such that at least some or all components of the wall 105 (e.g., soundproofing element 140, electromagnetic shielding element 145, first and second wall boards 141, 142, and/or soundproofing element 143) extend both above the acoustical ceiling 146 and below the finished floor 149). In one such specific example, the electromagnetic shielding element 145 can extend both perpendicular to and parallel to the acoustical ceiling 146, with the electromagnetic shielding element 145 extending parallel to the acoustical ceiling 146 at a location above the acoustical ceiling 146. For instance, the electromagnetic shielding element 145 can extend perpendicular to the acoustical ceiling 146 within the wall 105 and extend out from the wall 105 to extend parallel to the acoustical ceiling 146 when outside of the wall 105. In still a further such specific example, the electromagnetic shielding element 145 can also extend parallel to the acoustical ceiling 146 at a location adjacent the floor surface (e.g., between the finished floor surface and the structural floor surface) of the secure access kiosk 100. A structural support grid system 146a can be present to help support individual elements, such as acoustical ceiling tiles, forming the acoustical ceiling 146.

Figure 2:
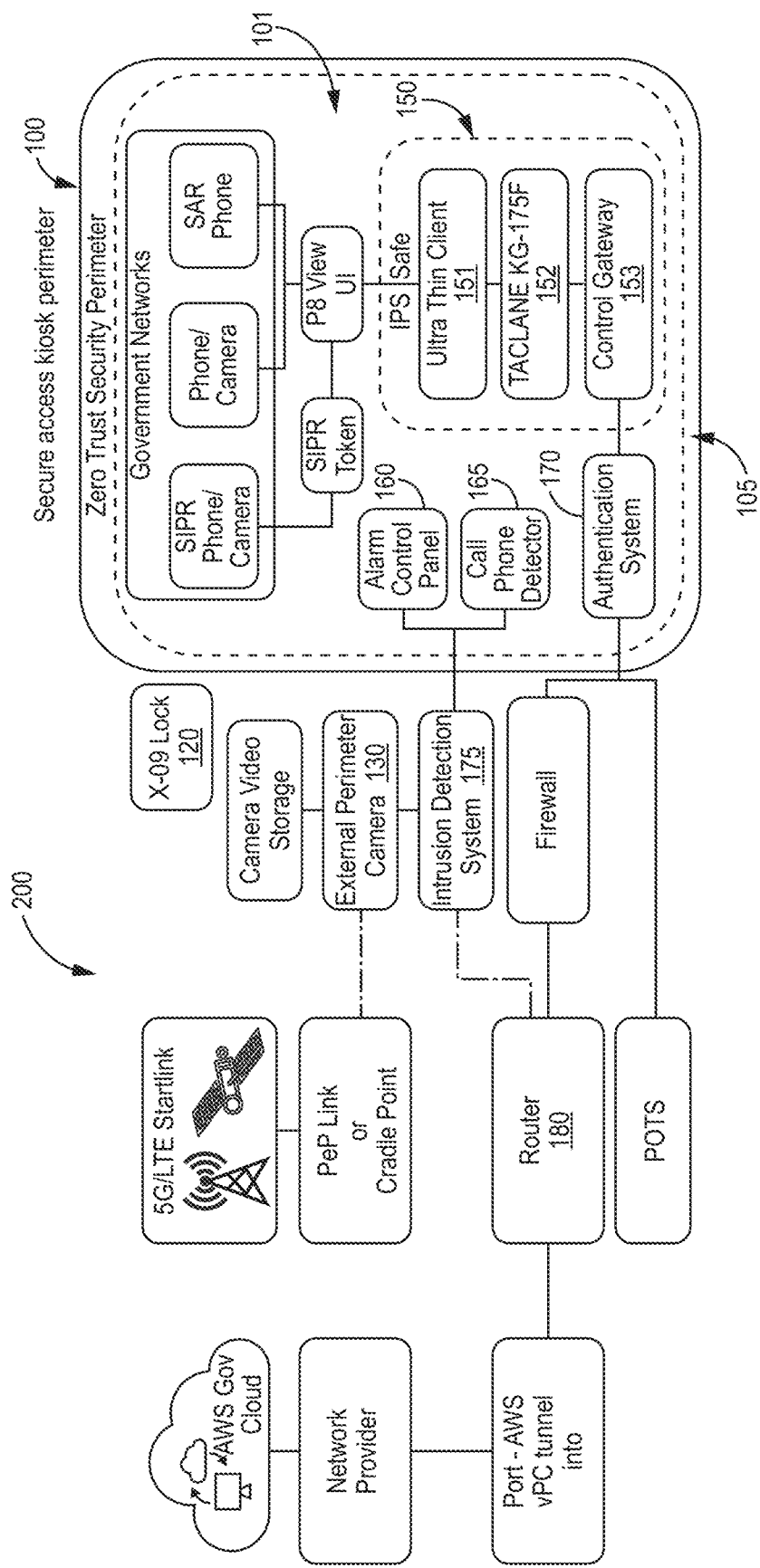
FIG. 2 is a schematic diagram of an exemplary embodiment of a network system that includes the secure access kiosk.

FIG. 2 shows a schematic diagram of an exemplary embodiment of a network system 200 that includes the secure access kiosk 100.

In addition to illustrating exemplary features of the network system 200, FIG. 2 shows some additional, exemplary features that can be included within the interior area 101 of the secure access kiosk 100. Within the interior area 101 of the secure access kiosk can be an information processing system (IPS) security container (e.g., safe) 150. The information processing system security container 150 can, for instance, be compliant with Federal Specification AA-C-2786.

As shown in the example of FIG. 2, the information processing system security container 150 can house a thin or ultra-thin client ("zero-trust client") 151, an encryption device 152, and a gateway controller 153 (e.g., including a network switch, network router, and/or voice-over-internet protocol ("VoIP") facilitation module) at the information processing system security container 150. As such, physical access to the ultra-thin client 151, an encryption device 152 (e.g., as a non-limiting example, one suitable type of encryption device 152 can be the TACLANE® crypto device from General Dynamics), and gateway controller 153 can be gained only with access to the information processing system security container 150.

The thin, or ultra-thin, client 151 can include only a software interface and, thus, may not possess an onboard computer operating system or digital storage and, thus, the thin, or ultra-thin, client 151 can be configured to exclude storage of other data besides the computer-executable instructions that, when executed, cause the programmable processor to provide the software interface. Thus, the ultra-thin client 151 can include a programmable processor and a non-transitory computer-readable storage article having computer-executable instructions stored thereon to cause at least one programmable processor to provide the software interface. The non-transitory computer-readable storage article may not store other data besides just the computer-executable instructions that, when executed, cause the programmable processor to provide the software interface. Consequently, the ultra-thin client 151 can be configured to prevent data storage or encryption to be loaded at the ultra-thin client 151 of the system. In turn, this can provide a more secure operating environment when the system is not operating since the system will be unclassified at rest (in a non-operable state), and, as a result, Secret (S), Top Secret (TS), Sensitive Compartmented Information (SCI), or Special Access Program (SAP) security measures would not apply or be significantly mitigated. The utilization of the ultra-thin client 151 at the secure access kiosk 100 can be suitable in conjunction with accredited Secret, Top Secret, Sensitive Compartmented Information, and Special Access Program cloud computing, for instance, facilitated via the router as shown in FIG. 2. In particular, with this availability of classified cloud computing, ultra-thin clients can now capitalize on high-performance computing at the S, TS, SCI, and SAP level. Additionally, cloud service providers can support encryption distribution and latency requirements by distributing cloud infrastructure to numerous locations across the United States. As a result, this enables the network 200 to receive encryption (required to operate on a classified network) from cloud service providers and operate the network 200 without managing encryption at each individual secure access kiosk 100 location. This can also eliminate the need for the secure access kiosk 100 provider to possess and manage an encryption account, which can be expensive and time consuming.

As shown in the example of FIG. 2, also included at the interior area of the secure access kiosk 100 can be an alarm control panel 160, a cell phone detector 165, and a user authentication system 170. The alarm control panel 160 can be coupled to one or more of the cell phone detector 165, intrusion detection system 175, and camera 130. The alarm control panel 160 can receive data and/or alarm signals from these devices to which it is coupled, and, in response, the alarm control panel 160 can output (e.g., locally at the secure access kiosk 100 and/or over the network 200) an alarm based on the received data and/or alarm signals. The cell phone detector 165 can be configured to detect the presence of a cell phone within the interior area of the secure access kiosk 100 and, in some embodiments, the cell phone detector 165 can send a cell phone detection signal to the alarm control panel 160. The authentication system 170 can be associated with the information processing system security container 150. For example, the authentication system 170 can be coupled to an ultra-thin client and a cryptologic device contained in the information processing system security container 150, and a user may access these systems using the authentication system 170.

The illustrated embodiment of FIG. 2 also shows the intrusion detection system 175 associated with the secure access kiosk 100. The instruction detection system 175 can be configured to detect the presence of a person within, or proximate the exterior, of the secure access kiosk 100. In some examples, the instruction detection system 175 can include one or more of (e.g., each of) the camera 130 the cell phone detector 165, a door motion sensor, a motion sensor within the interior of the secure access kiosk 100, and a noise attenuation generator configured to depress, attenuate, or obscure noise from emanating from the interior of the secure access kiosk 100.

The network 200 can deliver a secure and efficient operating environment that enables public and private customers to access classified computer and phone systems from their homes or offices via the secure access kiosk 100. Namely, the secure access kiosk 100 can facilitate an all-inclusive computer, phone, and video classified environment, over the network 200, with a fully networked intrusion detection system (IDS) at the secure access kiosk 100. Notably, in many cases, the network 200 can leverage a "Zero Trust Network" that combines components from multiple technology ecosystems into an integrated solution that maximizes security yet with zero encryption or data at rest (i.e. housed physically in storage at the secure access kiosk 100).

The network 200 can include built in redundancy for continuous (e.g., 24 hours/7 days a week/365 days a year) monitoring of all secure access kiosks 100 distributed throughout a geographic area. The secure access kiosk 100 can utilize a router 180 (e.g., a Cradlepoint router) with existing Internet Protocol (IP) networks as the primary communication channel, and existing cellular (e.g., 5G/LTE or space-based internet solution, e.g., Starlink) as a secondary or tertiary communication channel. The addition of secondary and tertiary security monitoring capabilities improves the network 200's ability to manage secure access kiosk security and threat response in a timely manner.

Figure 3:
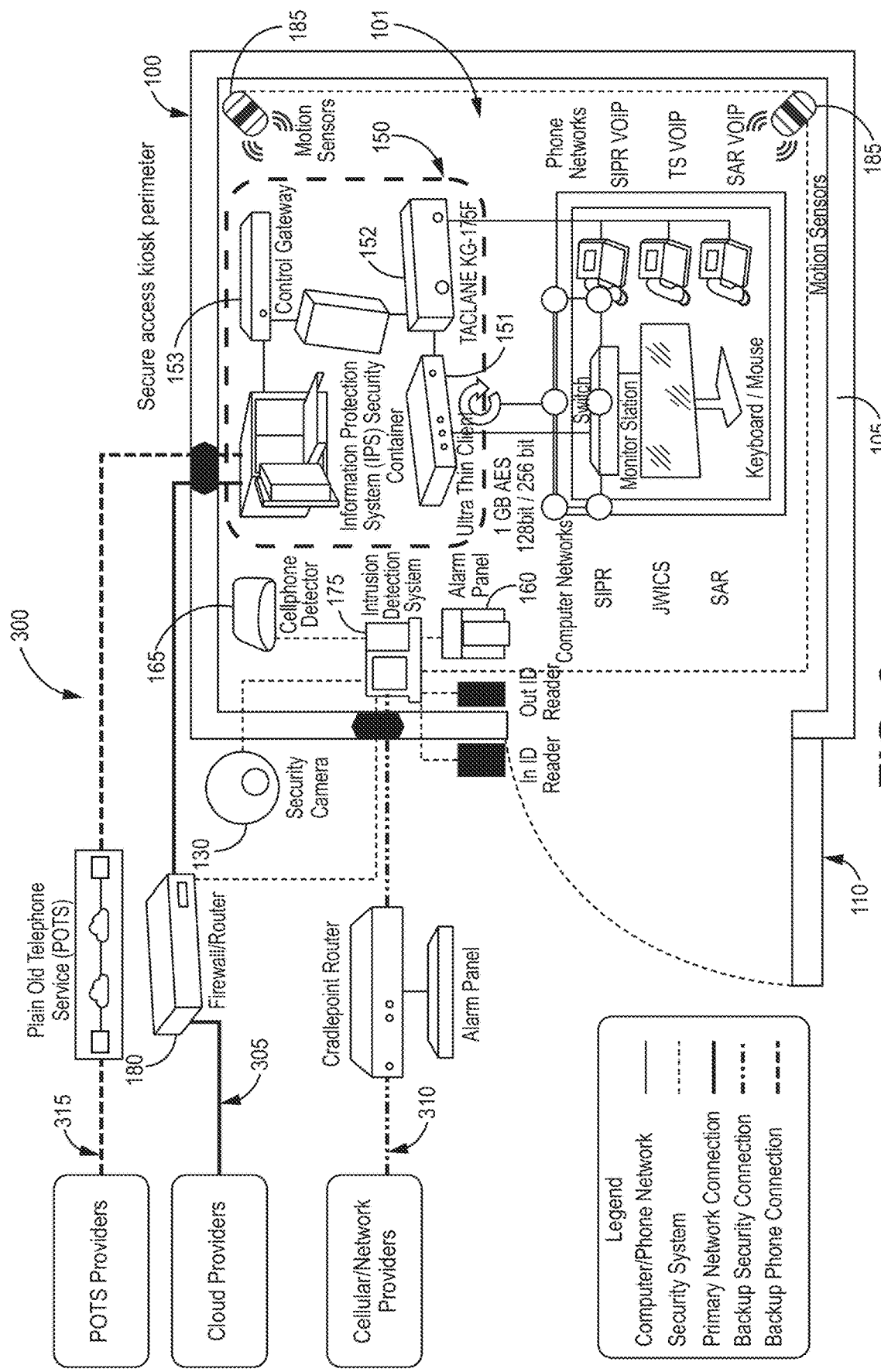
FIG. 3 is a schematic diagram of an exemplary embodiment of various devices, associated with the secure access kiosk, and their network connections.

FIG. 3 shows a schematic diagram of an exemplary embodiment of various devices, associated with the secure access kiosk 100, and their network connections in a network 300. The network 300 can be similar to the network 200 shown and described in reference to FIG. 2. Namely, the network 300 includes the redundant network connections via the primary IP network connection 305 and backup cellular network connection 310 and a plain old telephone service (POTS) network connection 315. As noted previously, the inclusion or redundant, or backup, network connections in the network 300 can improve the reliability of the network 300 to continuously monitor the secure access kiosk(s) 100 as well as manage secure access kiosk security and threat response in a timely manner.

As shown in the example embodiment of FIG. 3, the network 300 can include the primary IP network connection 305 for each of the information processing system security container 150 (and, thus, for the components housed therein, such as the thin or ultra-thin client ("zero-trust client") 151, the encryption device 152, and the gateway controller 153), the camera 130, the alarm control panel 160, the intrusion detection system 175, the cell phone detector 165, and the one or more motion sensors 185. The network 300 can also include the primary IP network connection 305 for the user computing device(s) and phone(s) within the secure access kiosk 100. Likewise, each of these devices having the primary IP network connection 305, can additionally have one or both of a redundant network connection in the form of the backup cellular network connection 310 and/or POTS network connection 315, such as in the architecture configuration shown in the embodiment of FIG. 3.

Although not illustrated in FIG. 2 or FIG. 3, in some embodiments the network 200 or 300 can include a central command center in communication with one or more secure access kiosks 100 over the network 200 or 300. The central command center can be configured to receive data from one or more of the devices associated with the secure access kiosk 100 and use this received data to monitor, authenticate, operate, and/or respond to needs of a user of a secure access kiosk 100.

Figure 4:
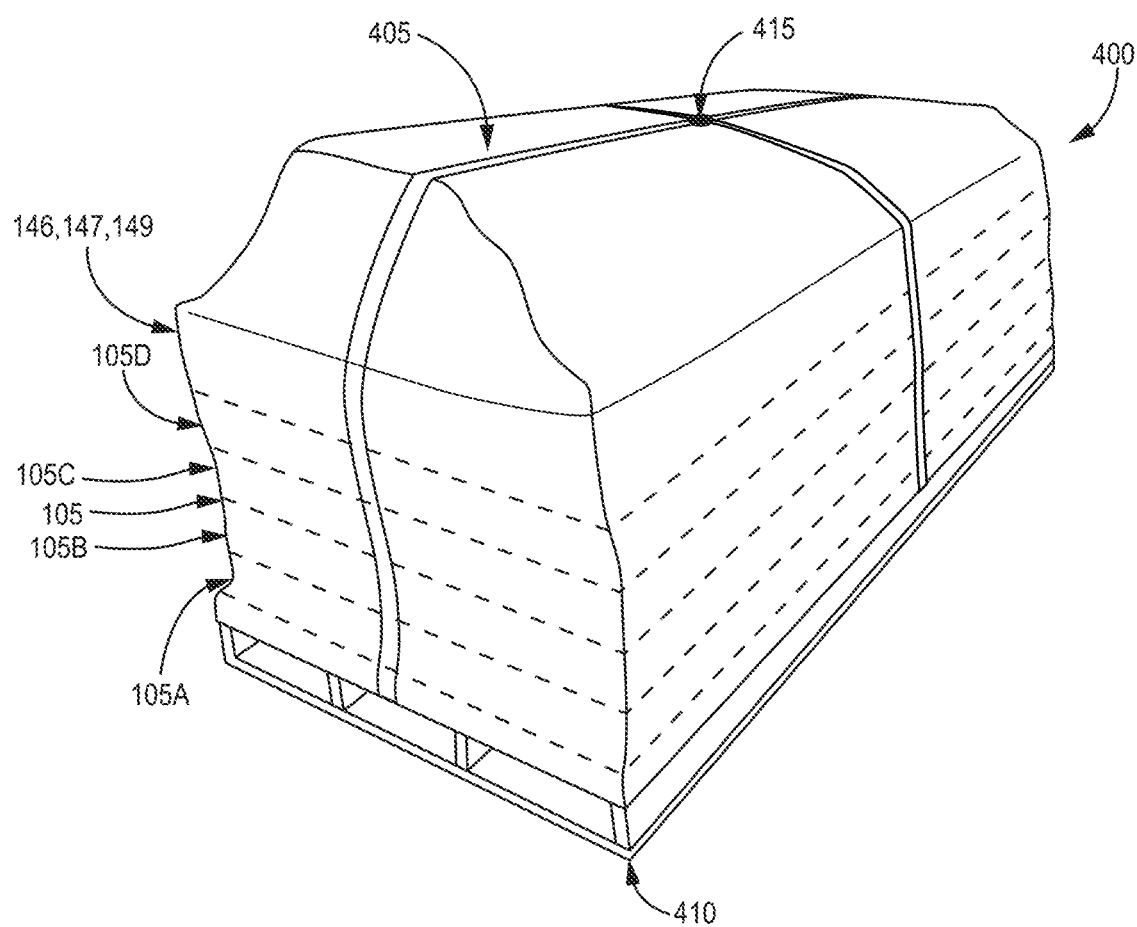
FIG. 4 is a perspective view of an exemplary embodiment of a secure access kiosk transportation unit.

FIG. 4 is a perspective view of an exemplary embodiment of a secure access kiosk transportation unit 400. The secure access kiosk transportation unit 400 can facilitate transportation (e.g., shipping) of one or more (e.g., each) of the components of the secure access kiosk 100 in a generally modular and efficient manner. This can be possible as a result of the configuration of the walls 105 and associated secure access kiosk components as disclosed elsewhere herein as such walls 105 and associated components can generally be relatively light-weight and both disassembled and assembled together in a generally modular fashion.

The secure access kiosk transportation unit 400 can include a secured container 405 and a plurality of the walls 105 enclosed within the secured container 405. The illustrated example shows a first wall 105a, a second wall 105b, a third wall 105c, and a fourth wall 105d included within the secured container 405. In addition, for some additional embodiments of the secure access kiosk transportation unit 400, such as that illustrated here, the secure access kiosk transportation unit 400 can include enclosed within the secured container 405, in addition to the plurality of walls 105, one or more of (e.g., each of) the acoustical ceiling 146 (e.g., and the structural support grid system 146a), the structural floor 147, and/or finished floor 149. The secure access kiosk transportation unit 400 can also include a pallet 410 or other suitable transportation device, and the secure container 405, which encloses the components of the secure access kiosk, can be supported on the pallet 410 or other suitable transportation device. As shown, the plurality of walls 105a-105d can generally be stacked flat on top of one another to create a contact profile enclosed within the secure container 405.

The secured container 405 can define a housing enclosing the components of the secure access kiosk, such as the walls 105 and other component(s). The secured container 405 can form a seal around the components of the secure access kiosk and can be tamper-resistant and, thus, be configured to resist unauthorized access into the interior of the secured container 405. In some embodiments, the secured container 405 can include a radio frequency identification (RFID) tag configured to help resist tampering with the interior of the secured container 405 and/or to facilitate tracking of a location of the secured container 405.

Various non-limiting exemplary embodiments have been described. It will be appreciated that suitable alternatives are possible without departing from the scope of the examples described herein.

What is claimed is:

1. A secure access kiosk comprising:
a plurality of walls interconnected to form an interior area within the secure access kiosk;
a soundproofing element fixed at each wall of the plurality of walls;
an electromagnetic shielding element fixed at each wall of the plurality of walls; and
an information processing system security container within the interior area of the secure access kiosk, the information processing system security container housing at least one of a thin client or an ultra-thin client, wherein the thin client or the ultra-thin client comprises a programmable processor and a non-transitory computer-readable storage article having computer-executable instructions stored thereon to cause the programmable processor to provide a software interface, with the non-transitory computer-readable storage article excluding storage of data other than the computer-executable instructions that, when executed, cause the programmable processor to provide the software interface such that the thin client or ultra-thin client is configured to prevent data storage or encryption to be stored at the thin client or ultra-thin client,
wherein each wall of the plurality of walls includes a first wall board facing an exterior of the secure access kiosk and a second wall board facing the interior area of the secure access kiosk, and wherein each of the soundproofing element and the electromagnetic shielding element extends within each wall of the plurality of walls between the first wall board and the second wall board.

2. The secure access kiosk of claim 1, wherein the thin client or the ultra-thin client includes an integrated classified network interface within the interior area of the secure access kiosk, wherein the integrated classified network interface is configured to connect the thin client or the ultra-thin client to an integrated classified network, and wherein the integrated classified network includes an approved agency facility accreditation and an agency approved authority to operate.

3. The secure access kiosk of claim 2, wherein the computer-executable instructions, when executed, are configured to cause the programmable processor at the thin client or ultra-thin client to transmit data outside of the interior area of the secure access kiosk, for storage at a location outside of the secure access kiosk, via the integrated classified network interface.

4. The secure access kiosk of claim 3, wherein the integrated classified network interface at the thin client or the ultra-thin client includes a primary network communication channel to a remote server and a secondary network communication channel to the remote server.

5. The secure access kiosk of claim 4, wherein the primary network communication channel is an internet protocol channel, and wherein the secondary network communication channel is a cellular channel.

6. The secure access kiosk of claim 4, further comprising:
a door at a wall of the plurality of walls, the door configured to provide access to the interior area of the secure access kiosk;
a lock associated with the door and configured to facilitate selective access at the door to the interior area of the secure access kiosk, the lock connected to the integrated classified network interface; and
a camera positioned to capture image data at a location adjacent the door, the camera connected to the integrated classified network interface.

7. The secure access kiosk of claim 6, further comprising:
an electromagnetic detector configured to detect electromagnetic energy adjacent an exterior of the secure access kiosk, the electromagnetic detector connected to the integrated classified network interface; and
an intrusion detection system configured to detect unauthorized access to the interior area of the secure access kiosk, the intrusion detection system connected to the integrated classified network interface.

8. The secure access kiosk of claim 7, wherein each of the lock, the camera, the electromagnetic detector, and the intrusion detection system is connected to the remote server via the primary network communication channel and the secondary network communication channel.

9. The secure access kiosk of claim 1, further comprising:
an acoustical ceiling supported at the plurality of walls, wherein each of the soundproofing element and the electromagnetic shielding element extends both above and below the acoustical ceiling.

10. The secure access kiosk of claim 9, wherein the electromagnetic shielding element extends perpendicular to the acoustical ceiling where the electromagnetic shielding element extends within each wall of the plurality of walls, and wherein the electromagnetic shielding element extends parallel to the acoustical ceiling where the electromagnetic shielding element extends outside of each wall of the plurality of walls and away from the soundproofing element.

11. The secure access kiosk of claim 10, further comprising:
a finished floor within the interior area of the secure access kiosk, wherein the electromagnetic shielding element extends above the finished floor perpendicular to the finished floor and below the finished floor parallel to the finished floor.

12. The secure access kiosk of claim 11, wherein the secure access kiosk further includes a wall-adjacent soundproofing element included at a void adjacent a wall of the plurality of walls and one of the finished floor and the acoustic ceiling.

13. The secure access kiosk of claim 12, wherein the wall-adjacent soundproofing element includes a first wall-adjacent soundproofing element and a second wall-adjacent soundproofing element, and wherein the first wall-adjacent soundproofing element is located at a first void adjacent a first wall fixation member and the first wall board and the second wall-adjacent soundproofing element is located at a second void adjacent a second wall fixation member and the first wall board.

14. A system comprising:
   a remote server; and
   a secure access kiosk, the secure access kiosk comprising:
      a plurality of walls interconnected to form an interior area within the secure access kiosk,
      a soundproofing element fixed at each wall of the plurality of walls,
      an electromagnetic shielding element fixed at each wall of the plurality of walls, and
      an information processing system security container within the interior area of the secure access kiosk, the information processing system security container housing at least one of a thin client or an ultra-thin client, wherein the thin client or the ultra-thin client comprises a programmable processor and a non-transitory computer-readable storage article having computer-executable instructions stored thereon to cause the programmable processor to provide a software interface, with the non-transitory computer-readable storage article excluding storage of data other than the computer-executable instructions that, when executed, cause the programmable processor to provide the software interface such that the thin client or ultra-thin client is configured to prevent data storage or encryption to be stored at the thin client or ultra-thin client,
      wherein the thin client or the ultra-thin client includes an integrated classified network interface within the interior area of the secure access kiosk, wherein the integrated classified network interface is configured to connect the thin client or the ultra-thin client to the remote server via an integrated classified network, and wherein the integrated classified network includes an approved agency facility accreditation and an agency approved authority to operate,
      wherein each wall of the plurality of walls includes a first wall board facing an exterior of the secure access kiosk and a second wall board facing the interior area of the secure access kiosk, and wherein each of the soundproofing element and the electromagnetic shielding element extends within each wall of the plurality of walls between the first wall board and the second wall board.

15. The system of claim 14, wherein the computer-executable instructions, when executed, are configured to cause the programmable processor at the thin client or ultra-thin client to transmit data to the remote server outside of the interior area of the secure access kiosk, for storage at the remote server at a location outside of the secure access kiosk, via the integrated classified network interface.

16. The system of claim 15, wherein the integrated classified network interface at the thin client or the ultra-thin client includes a primary network communication channel to the remote server and a secondary network communication channel to the remote server.

17. The system of claim 16, wherein the primary network communication channel is an internet protocol channel, and wherein the secondary network communication channel is a cellular channel.

18. The system of claim 14, wherein the secure access kiosk further comprises:
   an acoustical ceiling supported at the plurality of walls, wherein each of the soundproofing element and the electromagnetic shielding element extends both above and below the acoustical ceiling, wherein the electromagnetic shielding element extends perpendicular to the acoustical ceiling where the electromagnetic shielding element extends within each wall of the plurality of walls, and wherein the electromagnetic shielding element extends parallel to the acoustical ceiling where the electromagnetic shielding element extends outside of each wall of the plurality of walls and away from the soundproofing element; and
   a finished floor within the interior area of the secure access kiosk, wherein the electromagnetic shielding element extends above the finished floor perpendicular to the finished floor and below the finished floor parallel to the finished floor.

* * * * *